(12) United States Patent
Pechtold

(10) Patent No.: US 7,363,775 B2
(45) Date of Patent: Apr. 29, 2008

(54) USE OF Z-PIPES IN A LIQUID HYDROGEN TANK

(75) Inventor: Rainer Pechtold, Rüsselsheim (DE)

(73) Assignee: General Motors Corporation, Detroit, MI (US)

( * ) Notice: Subject to any disclaimer, the term of this patent is extended or adjusted under 35 U.S.C. 154(b) by 543 days.

(21) Appl. No.: 10/981,847

(22) Filed: Nov. 5, 2004

(65) Prior Publication Data

US 2006/0096302 A1    May 11, 2006

(51) Int. Cl.
*F25D 23/06* (2006.01)
(52) U.S. Cl. .................................. 62/451; 62/50.7
(58) Field of Classification Search .......... 62/451, 62/50.7; 138/115, 117; 141/7, 59
See application file for complete search history.

(56) References Cited

U.S. PATENT DOCUMENTS

| | | | | |
|---|---|---|---|---|
| 4,611,590 A | * | 9/1986 | Ryschka et al. | 128/203.14 |
| 5,400,602 A | | 3/1995 | Chang et al. | |
| 6,012,292 A | * | 1/2000 | Gulati et al. | 62/50.7 |
| 6,394,142 B1 | * | 5/2002 | Woelfel et al. | 138/115 |
| 6,450,205 B1 | | 9/2002 | Check | |
| 6,907,735 B2 | * | 6/2005 | Wolff et al. | 60/605.1 |
| 6,932,121 B1 | * | 8/2005 | Shivers, III | 141/1 |

FOREIGN PATENT DOCUMENTS

| | | |
|---|---|---|
| DE | 2217252 | 10/1973 |
| DE | 19546619 | 6/1997 |
| DE | 19546618 | 7/1997 |
| EP | 1039201 | 9/2000 |
| EP | 1353114 | 10/2003 |
| FR | 773584 | 11/1934 |
| FR | 2699251 | 6/1994 |
| GB | 2411711 | 9/2005 |
| WO | 02/01123 | 1/2002 |

* cited by examiner

*Primary Examiner*—Melvin Jones

(57) ABSTRACT

A Z-shaped, multi-channel conduit segment configured to transfer cryogenic fluid into and out of a cryogenic storage tank with minimal heat transfer. The conduit segment comprises a first channel operable to transport a cryogenic liquid from a supply source to the storage tank, and a second channel operable to transport gas from the storage tank to an end user. The conduit is preferably formed from a single piece of material, such that the first channel is separated from the second channel.

26 Claims, 8 Drawing Sheets

USE OF Z-PIPES IN A LIQUID HYDROGEN TANK

FIELD OF THE INVENTION

The present invention relates generally to cryogenic liquid storage tanks, and more particularly, to an improved cryogenic liquid storage tank with minimized heat transfer during filling and discharge.

BACKGROUND OF THE INVENTION

Fuel cells have been proposed as a power source for electric vehicles and other applications. In proton exchange membrane (PEM) type fuel cells, hydrogen is supplied to the anode of the fuel cell and oxygen is supplied as the oxidant to the cathode. A common technique for storing large quantities of hydrogen is to cool and compress hydrogen via liquefaction techniques and store the liquid phase hydrogen in a cryogenic storage tank. Hydrogen gas liquefies at $-253°$ C. at ambient pressure and can be stored at about 70 g/L in the liquid phase. The amount of energy required to compress hydrogen gas into a liquid is very high, and currently may be as much as up to 40% of the energy obtained from using the gas as a fuel. Thus, it is advantageous to keep the liquid phase hydrogen as insulated as possible from the surrounding ambient temperature.

Any transfer of heat to the innermost portion of the cryogenic storage tank affects the natural evaporation rate of the cryogenic vessel. The more heat that is transferred, the faster the rate of boil-off of the liquid hydrogen, or the higher the natural evaporation rate. In order to maintain the hydrogen in a liquid state, thereby minimizing excess vaporization and the need to vent the tank in order to release excess pressure, heat transfer from the ambient environment to the cryogen must be kept to a minimum. Cryogenic storage tanks generally consist of an inner storage vessel encapsulated with an outer vessel, or shell. The space between the inner vessel and the shell is commonly well insulated and under a vacuum. The interior of the tank, however, must include fluid communication, typically in the form of inlet and outlet piping, for the filling and discharge of cryogen. At least a portion of the piping is exposed to the ambient environment. As one of the primary sources of heat transfer, the piping bridges any insulation that is present, and allows heat from the ambient environment to penetrate into the inner vessel, leading to detrimental effects on the overall thermal insulation. Accordingly, there is a need for an improved cryogenic liquid storage tank, and particularly, one that minimizes heat transfer originating from the inlet and outlet piping.

SUMMARY OF THE INVENTION

The present invention provides a multi-channel conduit segment configured to transfer cryogenic fluid into and out of a cryogenic storage tank with minimal heat transfer. The conduit segment comprises a first channel operable to transport a cryogenic liquid from a supply source to the storage tank, and a second channel operable to transport gas from the storage tank to an end user. The conduit is preferably formed from a single piece of material, such that the first channel is separated from the second channel by an integral wall.

In another embodiment, the present invention provides a cryogenic fluid storage tank including a tank reservoir adapted to receive, store and discharge cryogenic fluid. The tank includes a substantially circular conduit segment connected to the tank reservoir. The conduit segment includes at least two discrete channels, a first channel adapted to receive a cryogenic fluid, preferably a liquid, and a second channel adapted to discharge a cryogenic fluid, preferably a low temperature gas.

The present invention also relates to a method of minimizing heat transfer during fluid transfer into and out of a cryogenic storage apparatus. The method includes providing an insulated tank enclosing a containment volume and a unitary conduit segment having first and second discrete channels therein. A volume of cryogenic fluid is introduced through the first channel, and a volume of gaseous fluid is released through the second channel.

Further areas of applicability of the present invention will become apparent from the detailed description provided hereinafter. It should be understood that the detailed description and specific examples, while indicating the presently preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
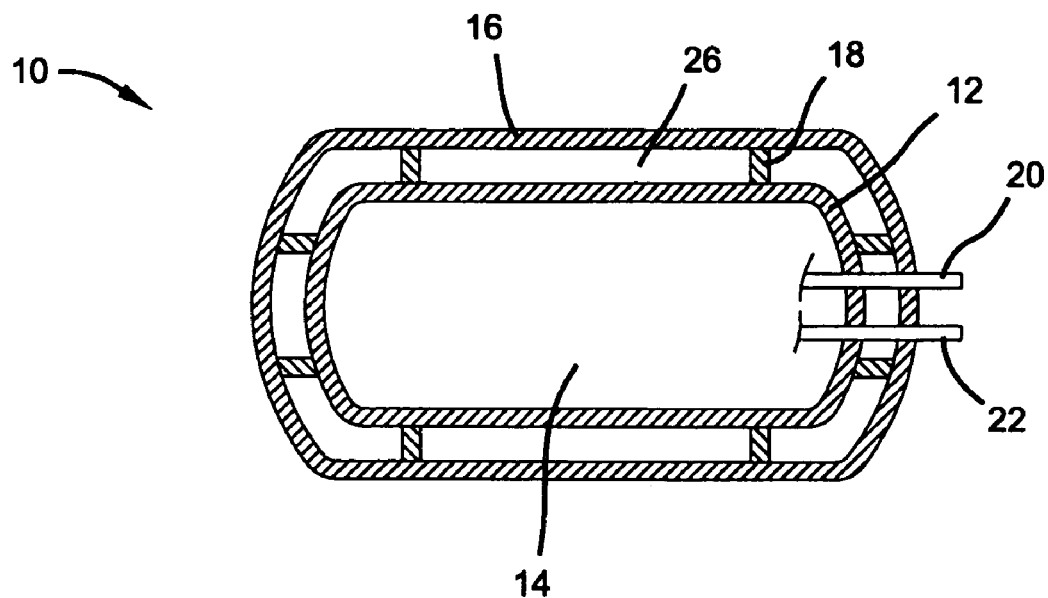
FIG. 1. is a cross-sectional view illustrating a prior art cryogenic tank.

FIG. 1. is a cross-sectional view illustrating a typical design of a prior art cryogenic tank 10. As illustrated, the cylindrical shaped storage tank 10 includes an inner vessel 12 having a containment volume 14 and surrounded by an outer vessel, or shell 16. The inner vessel 12 is generally separated from the shell 16 by a plurality of insulated cross supports 18 that prevent contact between the inner vessel 12 and the shell 16. Fluid communication into and out of the containment volume 14 is accomplished using an inlet port 20 and a separate outlet port 22, respectively. The cavity, or space between the inner vessel 12 and the shell 16 is typically filled with a multi-layered thermal vacuum insulation 26 as is known in the art. The shell 16 operates to maintain a vacuum in the space surrounding the inner vessel 12 for the effective operation of the insulation 26. A typical vacuum used for efficient operation of the vacuum insulation is about $7.5 \times 10^{-5}$ Torr. Although a vacuum is not generally needed to store pressurized hydrogen or other gases at ambient temperature, a vacuum is preferred when the containment volume 14 is filled with a cryogen for optimal insulation of the tank 10. As used herein, the term "cryogen" is used to refer to any substance in liquid phase that boils at or below about −160° C. when under standard atmospheric pressure. Non-limiting examples of cryogens include oxygen, nitrogen, hydrogen, and many refrigerants commonly known in the art.

Figure 2:
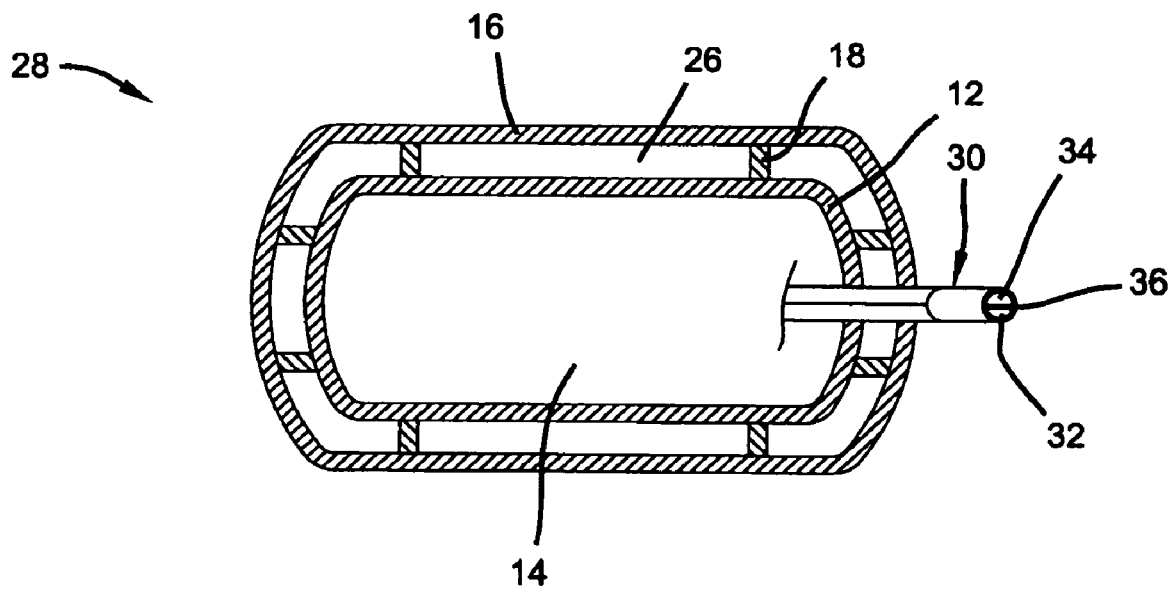
FIG. 2. is a cross-sectional view illustrating a first embodiment of a cryogenic tank according to the present invention.

As shown in FIG. 2, the cryogenic compatible storage tank 28 of the present invention is similar to a typical cryogenic tank in most aspects; however, it replaces the prior two pipe system having a separate and distinct inlet port 20 and outlet port 22 with a single, multi-channel conduit segment, or Z-shaped pipe 30 ("Z-pipe"). The combination of the two pipes 20, 22 into one Z-pipe 30 reduces the heat transfer between the inner vessel and the ambient environment. Heat transfer through the Z-pipe 30 depends on a number of factors. First the heat transfer is dependent on the thermal conductivity of the piping material. Additionally, heat transfer is directly proportional to the mass of material used for the Z-pipe 30 fabrication, and inversely proportional to its length. The multi-channel Z-pipe 30 of the present invention has less exposed external surface area in relation to the internal cross-sectional area, and depending on the wall thickness, this exposed surface area is reduced by about 35% as compared to a two pipe 20, 22 prior art cryogenic tank 10. Additionally, the amount of material used accountable for the heat transfer along the pipe is also reduced up to 15%, as will be discussed in more detail below.

While the segment of Z-pipe 30 in FIG. 2 is shown as a straight pipe section substantially aligned with the longitudinal axis of the tank 28, it is to be understood that the Z-pipe 30 alternatively could have a variety of slight curves, shapes and other orientations depending upon its placement in an automobile, or the like. Additionally, the Z-pipe 30 is shown entering a side portion 32 of the containment volume 14, but it is to be appreciated that the cryogenic tank 28 of the present invention will also work having a bottom fill, or a top fill, allowing the Z-pipe 30 to be attached to the tank 28 at many suitable locations.

The Z-pipe 30 preferably includes at least a first channel 32, or input line, for transporting gaseous or liquid cryogen from a supply source to the containment volume 14, and a second channel 34, or discharge line, for transporting cryogen or pressurized gas from the containment volume 14 to an end user. The two channels are divided from one another by a separating wall 36, integral to the Z-pipe 30. The separating wall 36 is not exposed to the exterior of the Z-pipe 30, thus should not substantially contribute to any heat transfer from the ambient environment to the interior of the containment volume 14.

As pressurized gas product is withdrawn from the tank, the pressure in the tank decreases, allowing for a portion of the cryogen to expand and boil off as a gas. This arrangement generally works well when there is high pressure after filling or periods of non-use. However, if there is only a minimal amount of cryogen present, or if the tank is filled with a lower pressure cryogen that operates at nearly stationary pressure levels (such as liquid natural gas), it may be beneficial to incorporate a heat transfer loop in the cryogenic tank. In such situations, a source of incoming heat assists in the cryogen vaporization and balances the product outflow so that the pressure of the tank remains nearly constant, even with minimal cryogen present. While various sources of heat would suffice, one presently preferred way of providing a source of heat is to incorporate a third channel 38 into the Z-pipe 30. In one embodiment, the third channel is filled with hydrogen at a higher temperature which would serve as a heater loop, and could be activated based on the interior pressure of the inner vessel 12. In an alternate embodiment, an electric heating unit (not shown) may be used inside or around the inner vessel 12, as is known in the art.

The first and second channels 32, 34 of the Z-pipe 30 will preferably have equivalent cross-sectional areas to that of the prior art inlet and outlet pipes 20, 22, thus permitting similar volumetric flow rates. In one embodiment, both channels 32, 34 have substantially equal cross-sectional areas. One difference, however, is that instead of having circular shaped cross-sections, the channels 32, 34 according to the present invention preferably have substantially half-circle shapes, minimizing both the external surface area and pipe mass required to transport a given volume of fluid. The Z-pipe 30 preferably has an overall inside diameter ($d_i$) of between about 7 to about 20 mm, depending upon the desired flow rate and amount of cryogen required to be transferred. More preferably, the inside diameter is between about 10 to about 15 mm. In certain instances, it may also be desirable to have a diameter less than 7 mm, or greater than 20 mm. One of the primary considerations influencing the selection of the diameter is the resulting pressure drop desired between the inner vessel and the discharge line. The pressure inside the inner vessel is typically maintained between about 4 and about 10 bar, however other pressure may be desirable. Typically, some type of pressure regulation system is provided outside of the tank 28 to maintain the desired pressure for the end user. A pressure regulator may be integral with the tank, or may be part of the end user system. The flow of hydrogen through the pipes results in a pressure drop. The level of pressure drop depends on the flow rate. The flow rate does not remain constant, therefore, the diameter of the pipes is chosen, such that the pressure regulation can operate as desired.

The thickness of the Z-pipe walls directly influences the design of the present invention. The thicker the walls, the more material that is present and able to transfer heat from the ambient environment to the vessel interior. It is therefore desirable to have a wall thickness as thin as possible. The thickness may partially depend upon the welds necessary to fabricate Z-pipe, as will be discussed in more detail below. It is presently preferred to have a wall thickness between about 0.5 to about 2 mm. More preferably, the wall thickness is less than about 1 mm. It is also preferred that the wall thickness is uniform along the external circumference of the Z-pipe 30. In an alternate embodiment, the interior wall 36 thickness may be slightly increased or decreased, as desired.

Figure 3:
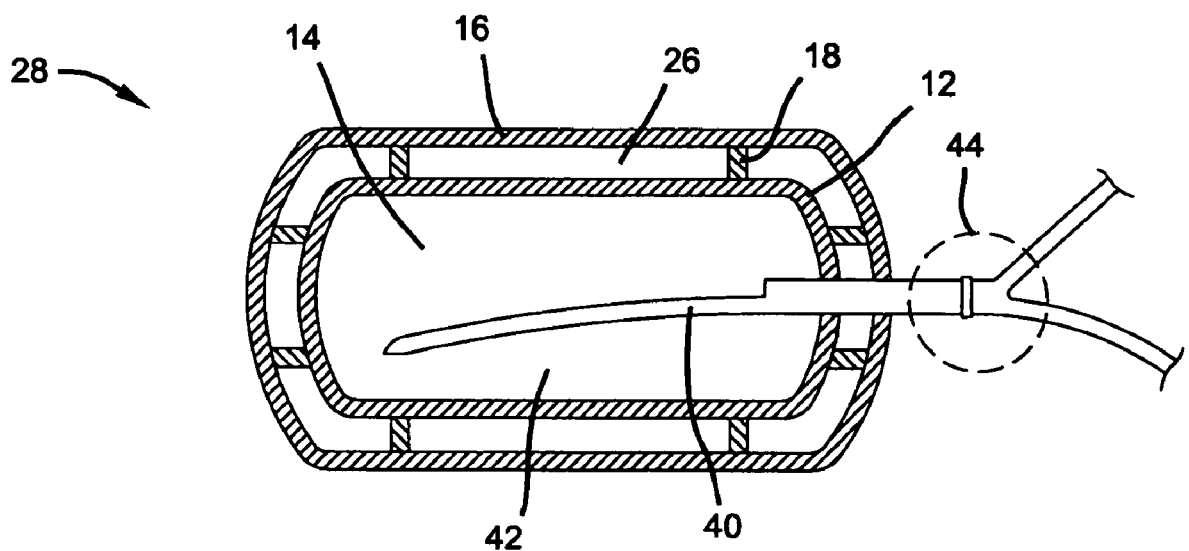
FIG. 3 is a cross-sectional view illustrating a second embodiment of a cryogenic tank according to the present invention.
Figure 4:
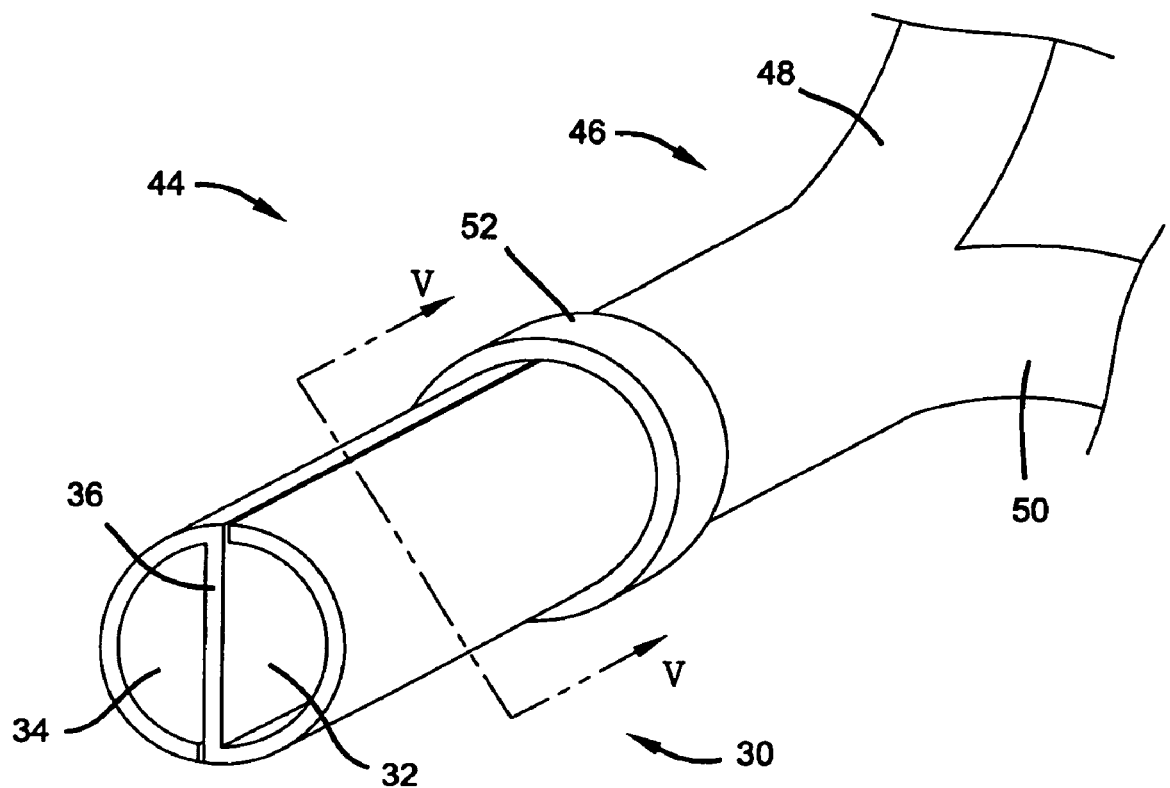
FIG. 4 is a magnified perspective view illustrating a connecting conduit segment as shown in FIG. 3.

The length of the Z-pipe can vary with the overall tank design. In certain designs, it may be beneficial to use the Z-pipe only in the critical areas of heat transfer (for example, near the interface between the outer shell and the ambient environment, as shown in FIG. 2), and then separate the Z-pipe into two conduits, either inside the tank, outside the tank, or both. The splitting can be accomplished in a variety of ways, including the use of connecting conduit segments such as a modified flow splitting "Y" shaped junction, or manifold assembly as known in the art. It should be understood that a manifold assembly can be configured to distribute fluid or gas from as many different channels that are present in the Z-pipe design. As shown in FIG. 3, in one embodiment of the present invention, at least a portion 40 of the Z-pipe 30, preferably the supply channel 32, extends to the bottom area 42 of the tank 28. FIG. 4 depicts a magnified view further illustrating a connecting area 44 of the Z-pipe according to one presently preferred embodiment. In this embodiment, the Z-pipe 30 is connected to a "Y" junction 46 or connecting conduit segment which operates to separate the multi-channel Z-pipe into discrete pipes 48, 50. The Z-pipe 30 is preferably threadedly engaged with the "Y" junction 46, or is otherwise attached via a coupling type connection 52.

The presently preferred material for the fabrication of the Z-pipe 30 is stainless steel. Given that weight is of critical importance, especially for vehicular applications, it is presently contemplated that the Z-pipe 30 may also be made with aluminum or another light-weight metal and/or alloy, including but not limited to stainless steel, aluminum alloys, and mixtures thereof.

Figure 5A:
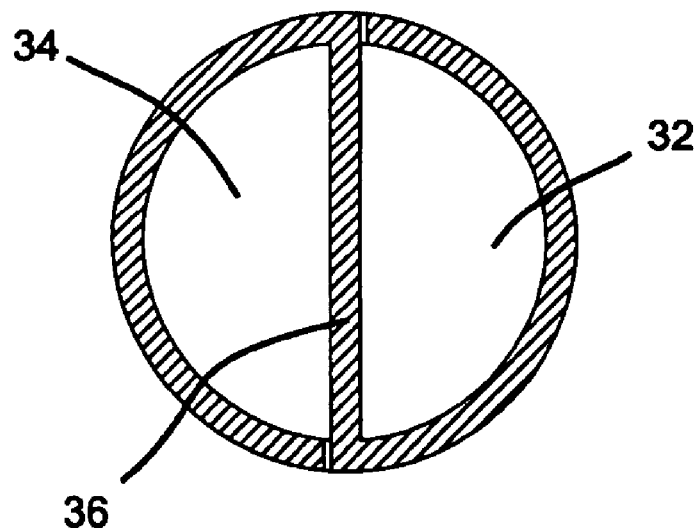
FIG. 5A is a cross-sectional view taken along the line V-V of FIG. 4.
Figure 5B:
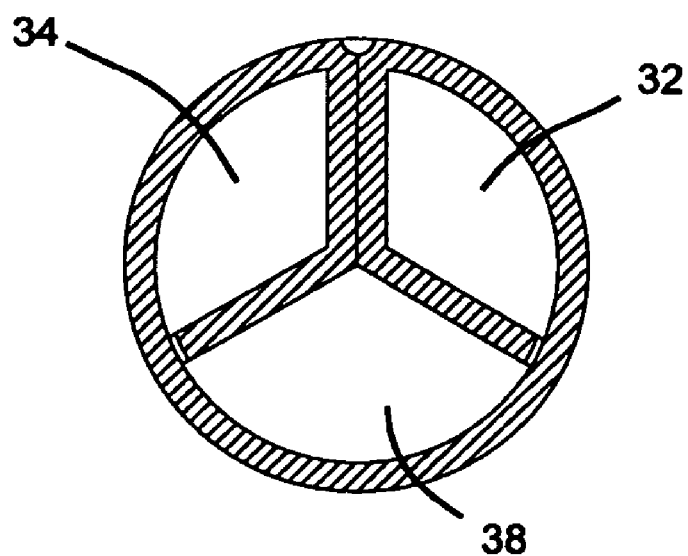
FIG. 5B is a cross-sectional view of an alternate embodiment of FIG. 5A.

FIGS. 5A and 5B show cross-sectional variations of the Z-pipe design, having two and three distinct channels, respectively. As previously discussed, it may be desired to use a third channel 38 to act as part of a heater loop when necessary. Alternate embodiments may contain even more channels, or channels having specific or custom designed cross-sectional areas. If it is desired to have more than three channels providing fluid communication into and out of the tank 28, it may be beneficial to use more than one Z-pipe. For example, a first Z-pipe would be used for cryogen transfer and a second Z-pipe would be used for a heater loop. One limiting factor in the design is the method used for the Z-pipe fabrication.

Figure 6A:
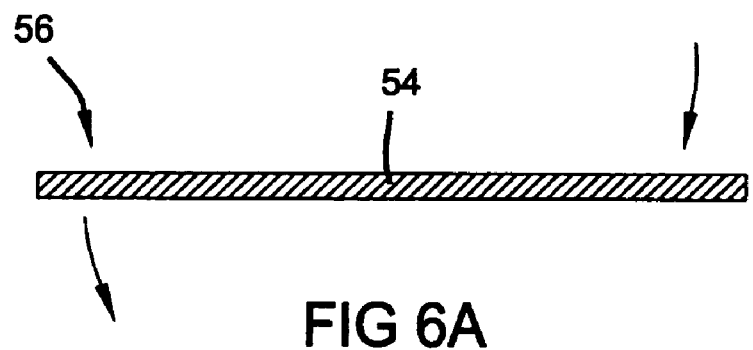
FIGS. 6a-6c illustrate a method of forming a conduit according to the present invention having a cross-section as depicted in FIG. 5A.
Figure 6B:
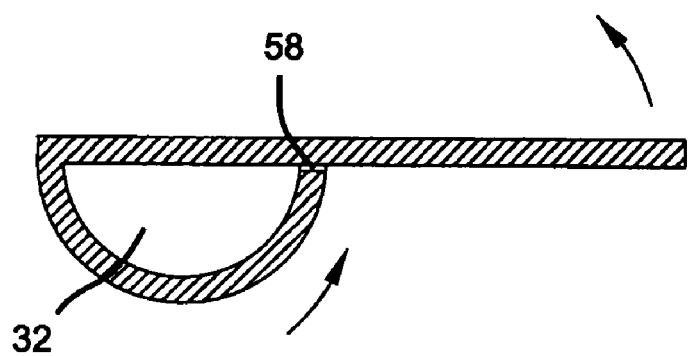
Figure 6C:
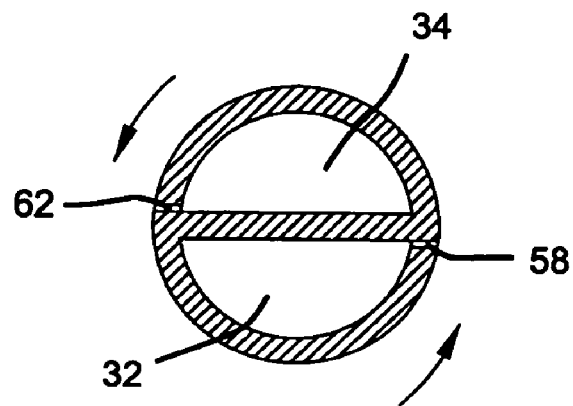
Figure 7A:
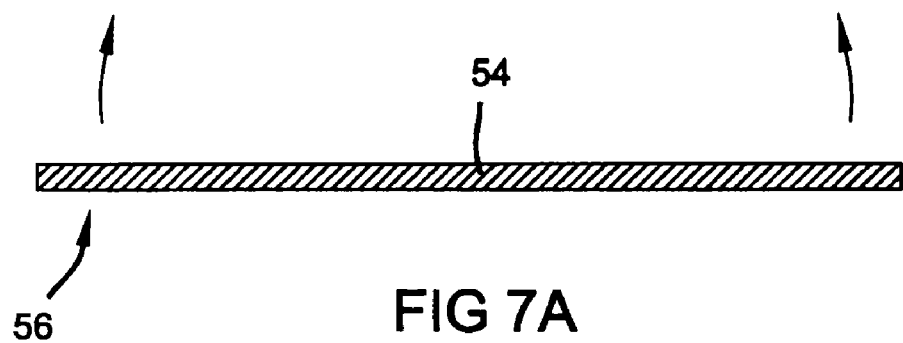
FIGS. 7A-7E illustrate a method of forming a conduit according to the present invention having a cross-section as depicted in FIG. 5B.
Figure 7B:
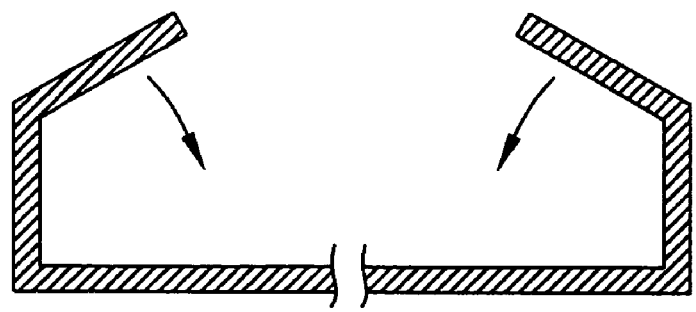
Figure 7C:
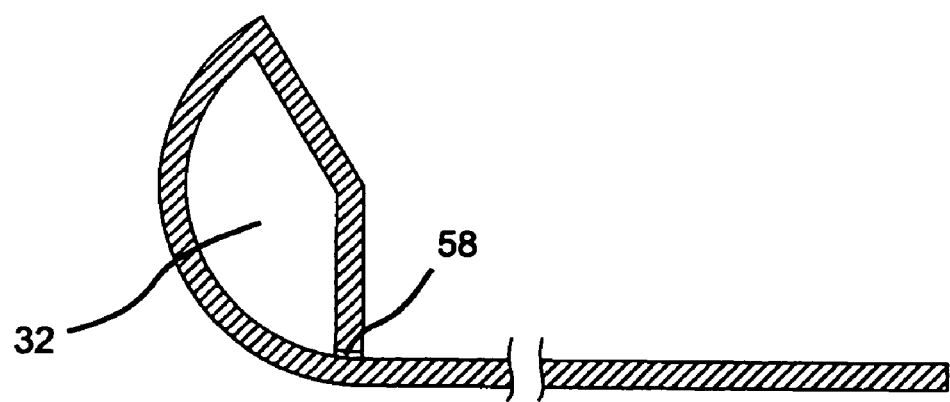
Figure 7D:
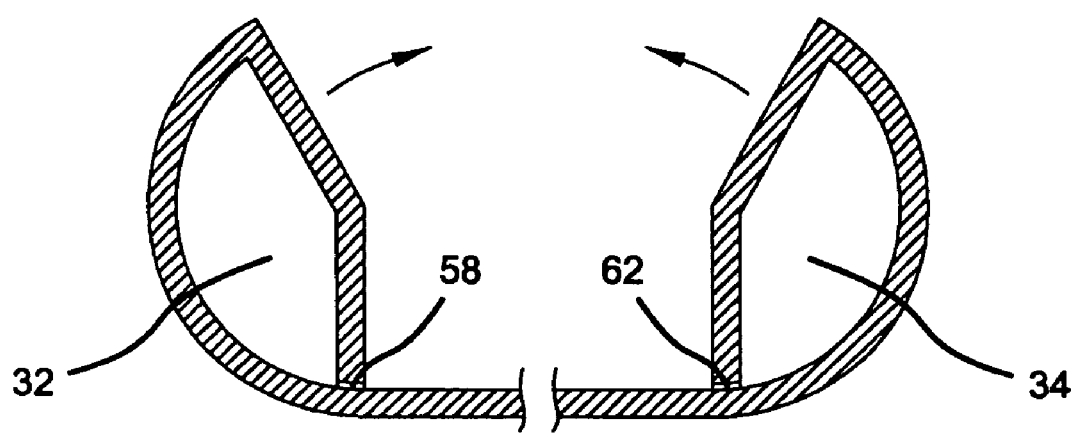
Figure 7E:
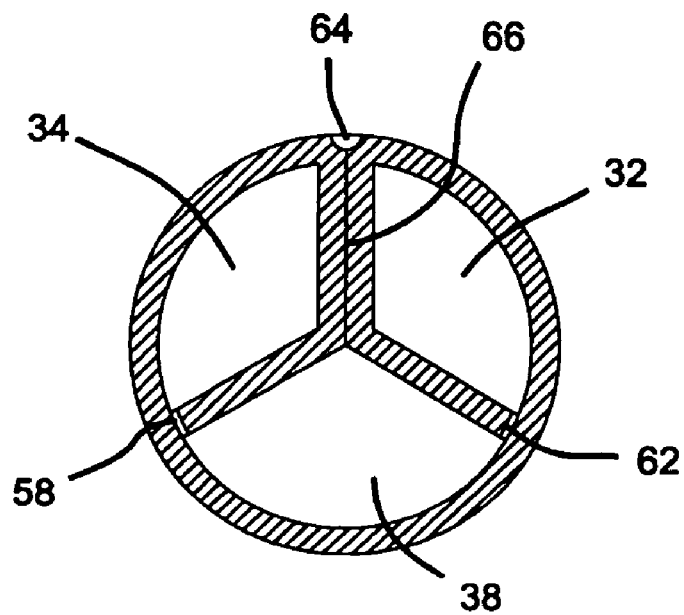

FIGS. 6A-6C illustrate one method of forming a Z-pipe from a unitary piece of material 54 and having a final cross-section as depicted in FIG. 5A. As previously mentioned, the material is preferably solid stainless steel, however alternate embodiments may include a suitable stainless steel plated material. As shown, a first channel 32 is formed by shaping a first end 56 of the material and welding a first seal 58 as known in the art. A second end 60 is similarly shaped and formed into a second channel 34 and secured with a second weld seal 62. Likewise, FIGS. 7A-7E illustrate a method of forming a Z-pipe from a unitary piece of material 54 and having a final cross-section as depicted in FIG. 5B. The creation of the third channel 38 may require at least one additional weld seal 64 as shown in FIG. 7E. Certain areas, such as the segment 66 of material between the first and second channels 32, 34 may be secured with an adhesive if desired. It should be noted that the welded and adhesively secured areas should be sufficiently bonded to one another to withstand the pressure of the low temperature gas, typically up to about 10 bar. As one skilled in the art can appreciate, numerous variations of the Z-pipe cross-section can be used and are within the scope of the present invention. An alternative method of fabrication, which may be well suited for a complex multi-channel design, is to use extrusion techniques to extrude a unitary Z-pipe. As opposed to a single piece of material shaped with a plurality of welded folds, the use of an extruded Z-pipe would simplify the manufacturing process by eliminating the need to pattern, shape, align and weld or bond areas of the conduit together. In one embodiment, the Z-pipe may be extruded of a non-metallic material and subsequently lined or plated with a metal selected from the group consisting of stainless steel, aluminum, and alloys and mixtures thereof.

As previously discussed, by combining the inlet and outlet ports into one single conduit, the present invention both minimizes exposed surface area, and decreases the amount of material required to fabricate the conduit, which ultimately reduces the amount of heat that can be transferred from the ambient environment to the inner vessel 12. The following data in Tables 1 and 2 compares the replacement of two equivalent sized inlet and outlet pipes with a Z-Pipe, whereby the total available interior cross-sectional area and wall thickness remain the same. Table 1 references a wall thickness of 1 mm, and Table 2 references a wall thickness of 2 mm. The data includes a comparison of both the exposed surface area and the mass of material required for each wall thickness.

The ratio of the circumference of the pipe (U) to the cross-sectional area (A) is defined by $$U/A = 4 \cdot \frac{da}{di^2}$$

where $d_i$ is the inner diameter, and $d_a$ is the outer diameter further defined as $da=2 \cdot s+di$, where s is the wall thickness. Thus, for the 2 pipe system, $$U/A = \frac{8 \cdot s + 4 \cdot di}{di^2}.$$

Since the combined cross-sectional areas of the 2 pipe system should equal the cross-sectional area of the Z-pipe, that is, $2 \cdot di^2 = di'^2$ or $di' = di \cdot \sqrt{2}$ where $d_i'$ is the Z-pipe inner diameter, for the Z-pipe, $$U/A = \frac{8 \cdot s + 4di \cdot \sqrt{2}}{(di \cdot \sqrt{2})^2}.$$

The mass of pipe material required for either pipe system is proportional to the cross-sectional area of the pipe material used. The cross-sectional area, F, can be determined by the relation $$F = \frac{\pi}{4}(da^2 - di^2)$$

where $d_i$ is the inner diameter, and $d_a$ is the outer diameter further defined as $da=2 \cdot s+di$, where s is the wall thickness. The total cross-sectional area for both pipes in the 2 pipe system can be simplified to $F=2 \cdot \pi \cdot s(di+s)$. For the Z-pipe, $$F = \frac{\pi}{4}(da'^2 - di'^2) + s \cdot di'$$

where $d_a'$ and $d_i'$ are the Z-pipe outer and inner diameters, respectively. Since $da'=2 \cdot s+di'$ and $di'=di \cdot \sqrt{2}$, the overall cross-sectional area of pipe material required for the Z-pipe can be simplified to $F=\pi \cdot d_i \cdot s \cdot \sqrt{2}+\pi \cdot s^2+s \cdot d_i^2 \cdot \sqrt{2}$.

TABLE 1

| s mm | di mm | U/A 2 Pipes | U/A Z-Pipe | U/A Z-Pipe/ 2 Pipes | F(mm²) 2 Pipes | F(mm²) Z-Pipe | F(mm²) Z-Pipe/2 Pipes |
|---|---|---|---|---|---|---|---|
| 1 | 4  | 1.50 | 0.96 | 0.638 | 31.416  | 26.570  | 0.846 |
| 1 | 5  | 1.12 | 0.73 | 0.648 | 37.699  | 32.427  | 0.860 |
| 1 | 6  | 0.89 | 0.58 | 0.655 | 43.982  | 38.284  | 0.870 |
| 1 | 7  | 0.73 | 0.49 | 0.661 | 50.265  | 44.141  | 0.878 |
| 1 | 8  | 0.63 | 0.42 | 0.666 | 56.549  | 49.998  | 0.884 |
| 1 | 9  | 0.54 | 0.36 | 0.669 | 62.832  | 55.855  | 0.889 |
| 1 | 10 | 0.48 | 0.32 | 0.673 | 69.115  | 61.713  | 0.893 |
| 1 | 11 | 0.43 | 0.29 | 0.675 | 75.398  | 67.570  | 0.896 |
| 1 | 12 | 0.39 | 0.26 | 0.678 | 81.681  | 73.427  | 0.899 |
| 1 | 13 | 0.36 | 0.24 | 0.679 | 87.965  | 79.284  | 0.901 |
| 1 | 14 | 0.33 | 0.22 | 0.681 | 94.248  | 85.141  | 0.903 |
| 1 | 15 | 0.30 | 0.21 | 0.683 | 100.531 | 90.998  | 0.905 |
| 1 | 16 | 0.28 | 0.19 | 0.684 | 106.814 | 96.855  | 0.907 |
| 1 | 17 | 0.26 | 0.18 | 0.685 | 113.097 | 102.712 | 0.908 |
| 1 | 18 | 0.25 | 0.17 | 0.686 | 119.381 | 108.569 | 0.909 |
| 1 | 19 | 0.23 | 0.16 | 0.687 | 125.664 | 114.426 | 0.911 |

TABLE 2

| s mm | di mm | U/A 2 Pipes | U/A Z-Pipe | U/A Z-Pipe/ 2 Pipes | F(mm²) 2 Pipes | F(mm²) Z-Pipe | F(mm²) Z-Pipe/2 Pipes |
|---|---|---|---|---|---|---|---|
| 2 | 4  | 2.00 | 1.21 | 0.604 | 75.398  | 59.423  | 0.788 |
| 2 | 5  | 1.44 | 0.89 | 0.615 | 87.965  | 71.137  | 0.809 |
| 2 | 6  | 1.11 | 0.69 | 0.624 | 100.531 | 82.852  | 0.824 |
| 2 | 7  | 0.90 | 0.57 | 0.632 | 113.097 | 94.566  | 0.836 |
| 2 | 8  | 0.75 | 0.48 | 0.638 | 125.664 | 106.280 | 0.846 |
| 2 | 9  | 0.64 | 0.41 | 0.643 | 138.230 | 117.994 | 0.854 |
| 2 | 10 | 0.56 | 0.36 | 0.648 | 150.796 | 129.708 | 0.860 |
| 2 | 11 | 0.50 | 0.32 | 0.652 | 163.363 | 141.422 | 0.866 |
| 2 | 12 | 0.44 | 0.29 | 0.655 | 175.929 | 153.137 | 0.870 |
| 2 | 13 | 0.40 | 0.26 | 0.658 | 188.496 | 164.851 | 0.875 |
| 2 | 14 | 0.37 | 0.24 | 0.661 | 201.062 | 176.565 | 0.878 |
| 2 | 15 | 0.34 | 0.22 | 0.664 | 213.628 | 188.279 | 0.881 |
| 2 | 16 | 0.31 | 0.21 | 0.666 | 226.195 | 199.993 | 0.884 |
| 2 | 17 | 0.29 | 0.19 | 0.668 | 238.761 | 211.708 | 0.887 |
| 2 | 18 | 0.27 | 0.18 | 0.669 | 251.327 | 223.422 | 0.889 |
| 2 | 19 | 0.25 | 0.17 | 0.671 | 263.894 | 235.136 | 0.891 |

Figure 8A:
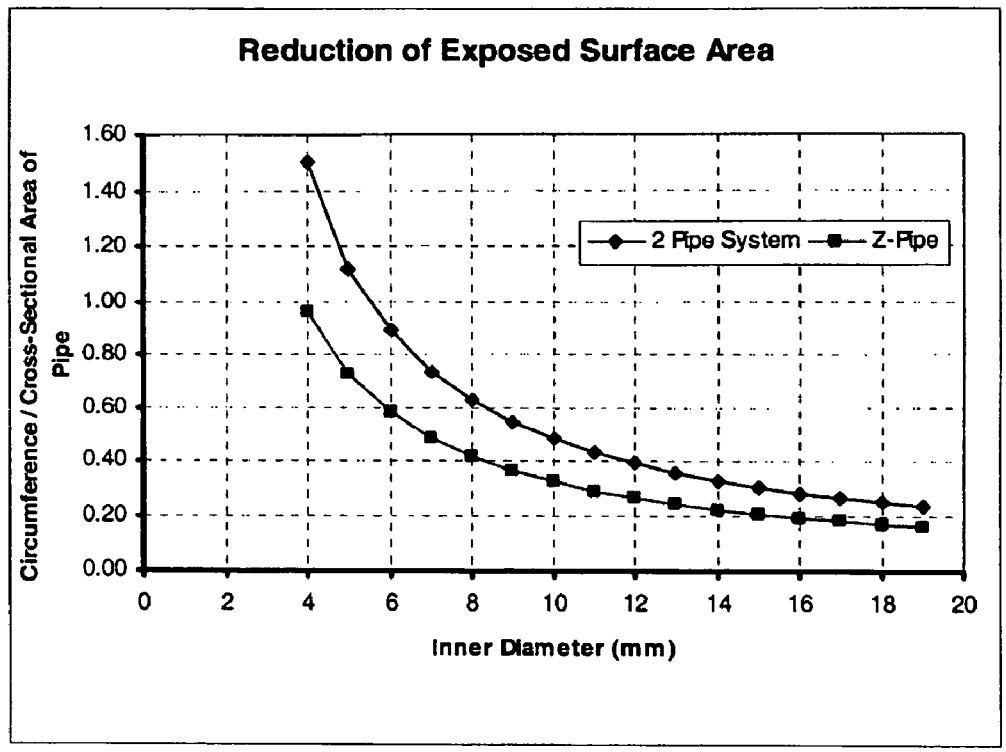
FIGS. 8A and 8B illustrate the reduction of exposed surface area and pipe cross-sectional area, respectively, by using a Z-pipe according to the principles of the present invention.
Figure 8B:
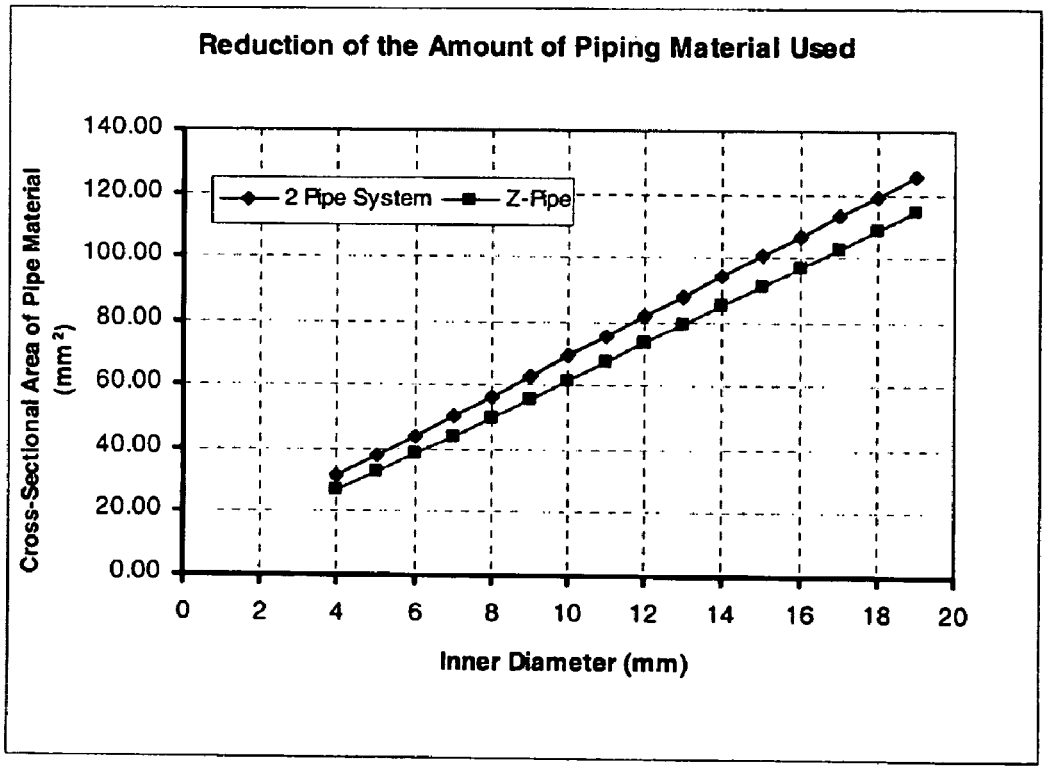
Figure 9A:
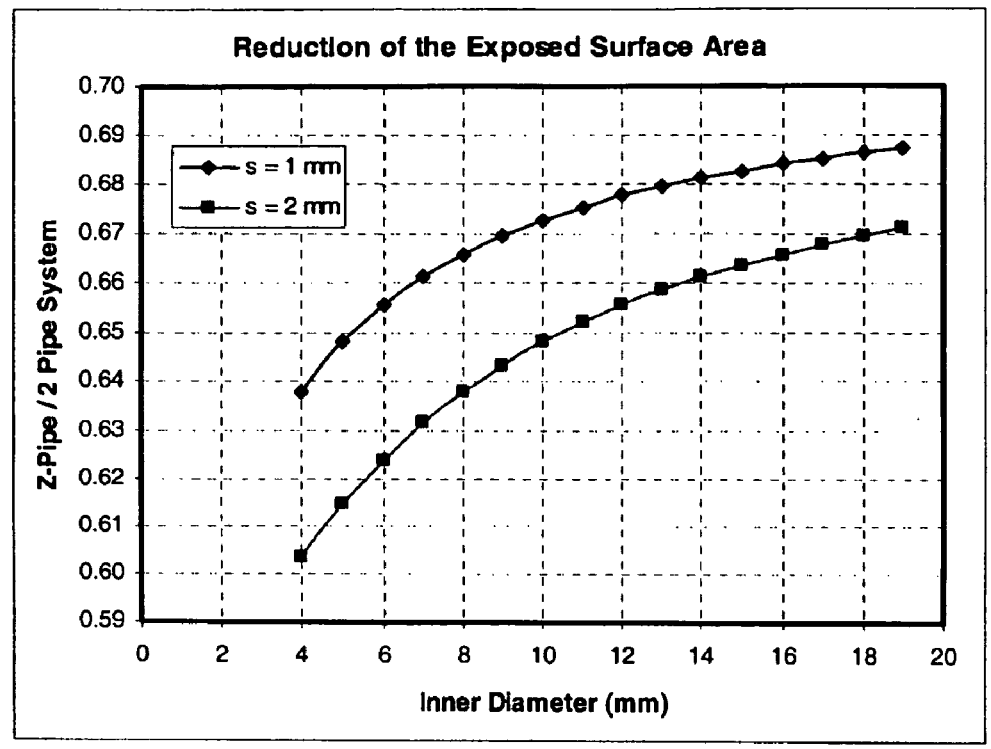
FIGS. 9A and 9B compare the reduction of exposed surface area and pipe cross-sectional area, respectively, for Z-pipes having a wall thickness of 1 and 2 mm.
Figure 9B:
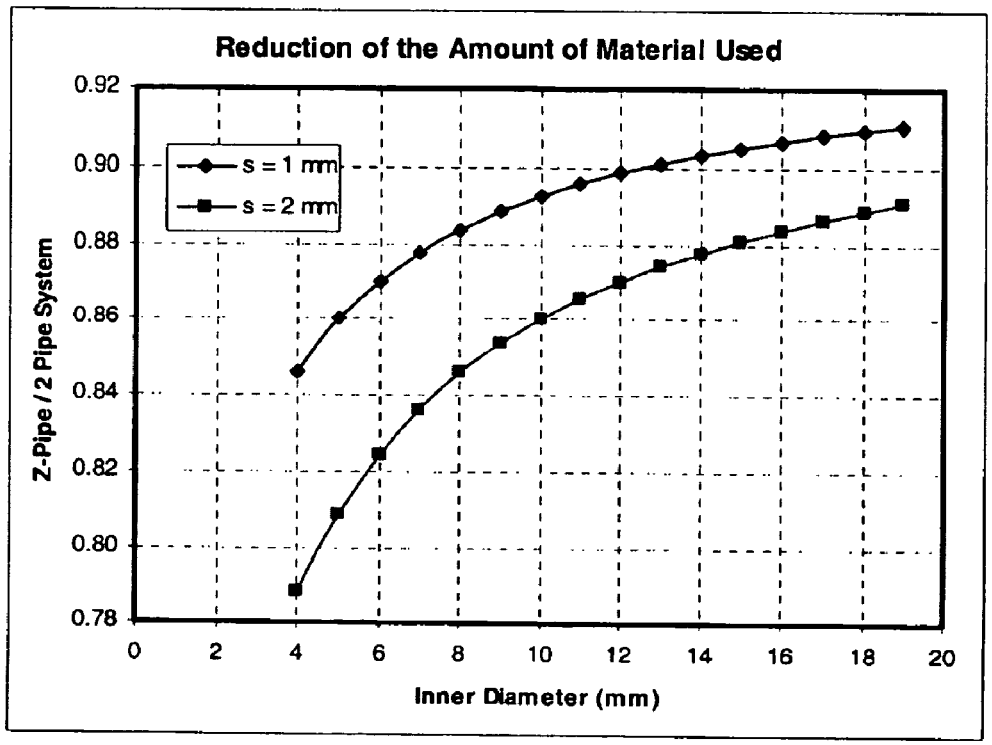

The benefits of using the Z-pipe of the present invention as compared to the prior 2 pipe system are graphically depicted in FIGS. 8 and 9. FIG. 8A illustrates the reduction of exposed surface area by presenting a plot of the ratio of the outer circumference (U) of the pipes divided by the interior cross-sectional area (A) as a function of inner diameter (di). FIG. 8B illustrates the reduction of the amount of piping material used with the combined Z-pipe as compared to the 2 pipe system as a function of inner diameter. FIGS. 8A and 8B both illustrate a Z-pipe with a wall thickness of 1 mm. FIGS. 9A and 9B compare the reduction of exposed surface area and pipe mass, respectively, for Z-pipes having a wall thickness of both 1 and 2 mm.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-channel conduit segment configured to transfer cryogenic fluid into and out of a cryogenic storage tank with minimal heat transfer, the conduit segment comprising:

a first channel having a first cross-sectional area and adapted to transport cryogenic liquid from a supply source to the storage tank;

a second channel having a second cross-sectional area and adapted to transport gas from the storage tank to an end user, wherein the conduit is formed from a single piece of material having at least one welded fold along a longitudinal axis such that said first channel is separated from said second channel.

2. The conduit segment of claim 1, wherein said first and second cross-sectional areas are substantially equal.

3. The conduit segment of claim 1, wherein said first and second cross-sectional areas are substantially half-circle shaped.

4. The conduit segment of claim 1, further comprising a third channel having a third cross-sectional area.

5. The conduit segment of claim 1, wherein said first, second and third cross-sectional areas are substantially equal.

6. The conduit segment of claim 1, further adapted for use with a manifold assembly.

7. The conduit segment of claim 1, fabricated from a metal selected from the group consisting of stainless steel, aluminum, and alloys and mixtures thereof.

8. The conduit segment of claim 1, comprising a plurality of welded folds, each extending along a longitudinal axis.

9. The conduit segment of claim 1, comprising a wall thickness between about 0.5 to about 2 mm.

10. The conduit segment of claim 1, comprising a wall thickness of less than about 1 mm.

11. The conduit segment of claim 1, wherein said conduit is fabricated using extrusion techniques.

12. The conduit segment of claim 11, wherein said conduit is lined or plated with a metal selected from the group consisting of stainless steel, aluminum, and alloys and mixtures thereof.

13. A cryogenic fluid storage tank comprising:

a tank reservoir adapted to receive, store, and discharge cryogenic fluid; and a substantially circular conduit segment in fluid communication with said reservoir and adapted for both receiving and discharging a cryogenic fluid;

wherein said conduit segment comprises a unitary material having at least one welded fold along a longitudinal axis that forms at least two discrete channels therein.

14. The storage tank of claim 13, wherein said conduit segment has an inner diameter of between about 10 to about 15 mm.

15. The storage tank of claim 13, wherein said conduit segment comprises a plurality of welded folds, each extending along a longitudinal axis.

16. The storage tank of claim 13, wherein said conduit segment comprises a wall thickness between about 0.5 to about 2 mm.

17. The storage tank of claim 13, wherein said conduit segment comprises a wall thickness less than about 1 mm.

18. The storage tank of claim 13, wherein said conduit segment comprises:

a filling channel adapted to provide fluid communication between said tank reservoir and an external cryogenic fluid source; and a supply channel adapted to provide fluid communication between said tank reservoir and an external discharge line.

19. The storage tank of claim 18, wherein a pressure differential between said tank reservoir and said external discharge line is less than about 10 bar.

20. The storage tank of claim 18, wherein said conduit segment further comprises a heat transfer channel.

21. The storage tank of claim 18, wherein at least a portion of said conduit segment extends to a bottom area of said tank reservoir.

22. The storage tank of claim 13, wherein said conduit segment comprises a material selected from the group consisting of stainless steel, aluminum, and alloys and mixtures thereof.

23. The storage tank of claim 13, adapted for use with a PEM fuel cell assembly.

24. The storage tank of claim 13, wherein said cryogenic fluid is hydrogen.

25. A method for transporting cryogenic fluid into and out of cryogenic storage while minimizing heat transfer, the method comprising:

providing an insulated storage tank enclosing a containment volume;

providing a unitary conduit segment having an integral inner wall separating first and second channels formed therein, wherein the unitary conduit segment includes at least one welded fold extending along a longitudinal axis that forms one of the first and second channels;

introducing a volume of cryogenic fluid from a source through said first channel to said containment volume; and releasing a volume of gaseous fluid through said second channel to an end user for use with a PEM fuel cell assembly.

26. The method according to claim 25, further providing a pressure differential of less than about 10 bar between said insulated tank and the ambient environment.

* * * * *